United States Patent
Schuman

[15] 3,695,325
[45] Oct. 3, 1972

[54] TEMPORARY TIRE FOR AUTOMOTIVE VEHICLES

[72] Inventor: Mark Schuman, 101 G. St. S.W., Apt. 516, Washington, D.C. 20024

[22] Filed: Nov. 23, 1970

[21] Appl. No.: 91,839

[52] U.S. Cl. ............................................. 152/225
[51] Int. Cl. .............................................. B60c 27/16
[58] Field of Search ...... 152/225; 301/38 R, 38 S, 39, 301/40; 305/19

[56] References Cited

UNITED STATES PATENTS 1,791,293   2/1931   Steinberg ................. 301/39 R
3,595,294   7/1971   Strelli ....................... 152/225

Primary Examiner—James B. Marbert

[57] ABSTRACT

A temporary vehicle tire in the form of a wide, chain-like strip wrapped around the periphery of an automotive vehicle pneumatic tire mounted upon the rim of a vehicle wheel, the strip having spoke-like legs extending radially inwardly on opposite sides of the pneumatic tire and frictionally clamped to the side edges of the rim to form an independent outer wheel tread or tire.

5 Claims, 6 Drawing Figures

PATENTED OCT 3 1972

3,695,325

INVENTOR
MARK SCHUMAN
BY Cullen, Settle, Sloman & Cantor
ATTORNEYS

TEMPORARY TIRE FOR AUTOMOTIVE VEHICLES

BACKGROUND OF INVENTION

Conventionally, when the pneumatic tire of an automotive vehicle becomes flat, e.g., due to loss of air because of puncture, blow-out, etc., the wheel is removed and replaced with another wheel upon which a spare tire is mounted. Since the removal of the wheel carrying the flat tire and the mounting of the spare tire wheel is difficult for many people, efforts have been made in the past to provide some means which functions as a temporary or emergency wheel, without removal of the wheel with the flat tire so that the vehicle can be driven to a service garage.

One form of such emergency wheel is a disc, to be fastened to the wheel, when needed, using the same bolts which fasten the wheel to the axle hub. This requires the removal of the wheel nuts and fastening of the emergency wheel disc upon the face of the flat tire wheel. Unfortunately, this nut removal is quite difficult and thus such type of emergency wheel has been unsuccessful.

The invention herein thus relates to a means for providing a temporary tread or tire or rim around the outside of a mounted tire and wheel, which will support the vehicle long enough to get it to a service garage, and which may be applied simply, without jacking up or raising the vehicle and without the need for removing the nuts of the wheel or in any other way disturbing the tire or wheel, despite having a flat tire.

SUMMARY OF INVENTION

The invention herein contemplates providing a wide, chain-like strip which may be wrapped around a pneumatic tire and secured to the rim of the wheel upon which the tire is mounted, by means of spoke-like legs which frictionally clamp to the wheel rim and temporarily secure the strip in place to function as an independent tire or rim or tread for the vehicle wheel, which thus acts as a wheel hub. More specifically, the strip is formed of a number of U-shaped plates which are interconnected end to end by hinges to provide spoke-like legs for fitting around the opposite sides of the tire and clamping to the vehicle wheel rim side flanges.

The chain-like strip with the spoke forming members is so arranged that the vehicle wheel having a flat tire may be driven onto the strip, causing the strip to encircle the wheel and mount itself.

These and other objects and advantages of this invention will become apparent upon reading the following description, of which the attached drawings form a part.

DETAILED DESCRIPTION

Figure 1:
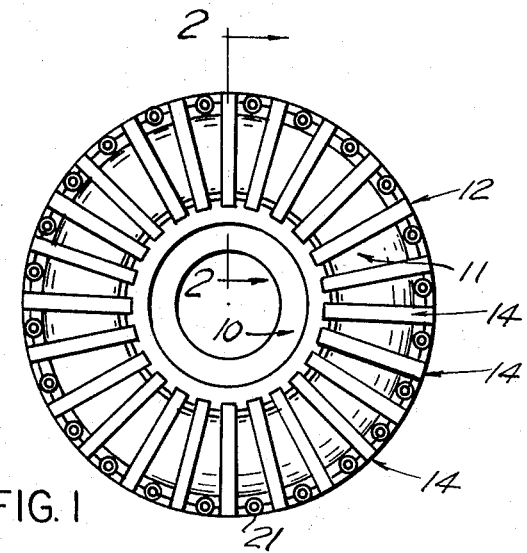
FIG. 1 is an elevational view of an automotive vehicle wheel with the temporary tire secured thereto.
Figure 2:
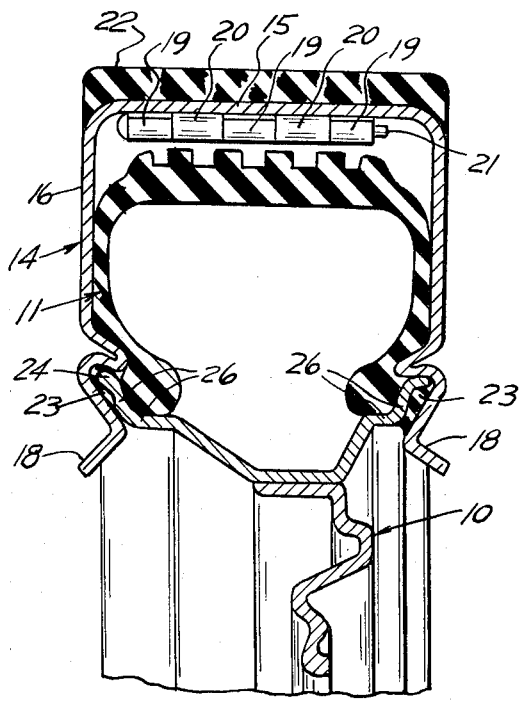
FIG. 2 is an enlarged cross-sectional view taken in the direction of arrow 2—2 of FIG. 1.
Figure 3:
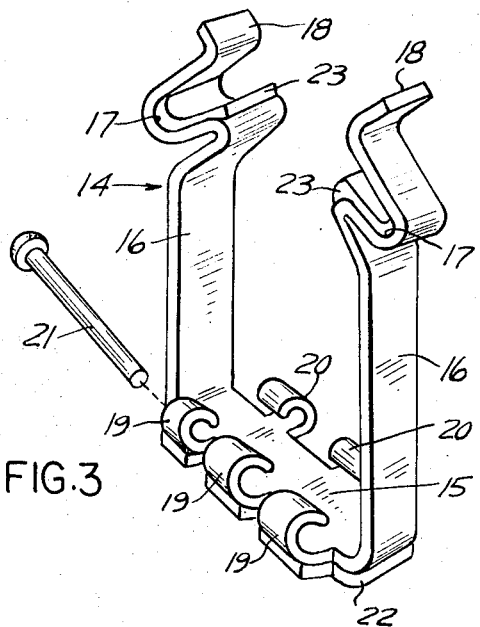
FIG. 3 is an enlarged, perspective view showing a plate element and pin forming the temporary tire.

FIG. 1 illustrates a conventional automobile vehicle wheel 10 upon which is mounted a conventional pneumatic tire 11, the same normally being used on automobiles, trucks and the like. Surrounding the periphery or tread of the tire is the temporary tire in the form of a chain-like strip 12 which is formed of a number of U-shaped metal members 14 (see FIG. 3) having plate forming bases 15 and integral legs 16 which form spokes.

The free ends of the legs 16 are bent into inwardly opening channels 17 and terminate in flared ends 18.

The opposite ends of the bases 15 are provided with integral hinge loops 19 and 20 to form a hinge half on each side of each base 15. These hinge halves on adjacent plates are meshed or aligned and connected together by hinge pins 21.

Preferably, the outer surface of the base portions 15 are coated with a thick rubber-like cushion 22. Also, rubber or rubber-like material inserts 23 may be provided within the channels 17 of the legs or spokes 16 for better gripping of the flanges of the vehicle wheel.

The strip 12 may be laid flat or coiled for storage and kept in a trunk of an automotive vehicle for use when necessary. It thus appears in the form of a flat ribbon or strip of a width approximately equal to the width of the vehicle tire and with the legs extending normal to the strip.

OPERATION

Figure 5:
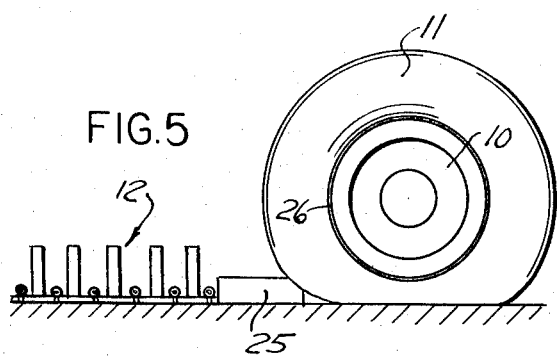
FIG. 5 illustrates a flat tire of an automotive vehicle with the tire arranged to roll upon the chain-like temporary tire.

Referring to FIG. 5, when the automotive vehicle tire becomes flat, for whatever reason, the strip 12 is aligned with the tire upon the ground so that the tire may be rolled onto the strip for wrapping the strip around the tire.

For this purpose, it is desirable to arrange a block 25, preferably of a resilient material such as rubber, in front of the tire so the tire rolls up and then down upon the strip for starting. As the vehicle moves forwardly and the tire rolls upon the strip, the flared or leading edges 18 of the legs tend to spread the legs apart somewhat until the channels 17 snap-fit over and receive the side edge flanges 24 or bead seats 26 of the wheel rim.

Ultimately, as the wheel rolls upon the strip, each successive pair of legs or spokes 16 embrace the tire and snap or clamp upon the vehicle wheel rim edges until the strip completely surrounds the periphery of the tire. At this point, the hinge loops of the two adjacent end members 14 may be manually moved together and an extra or loose pin 1 inserted therein to complete the strip into its continuous chain-like configuration around the tire.

Figure 4:
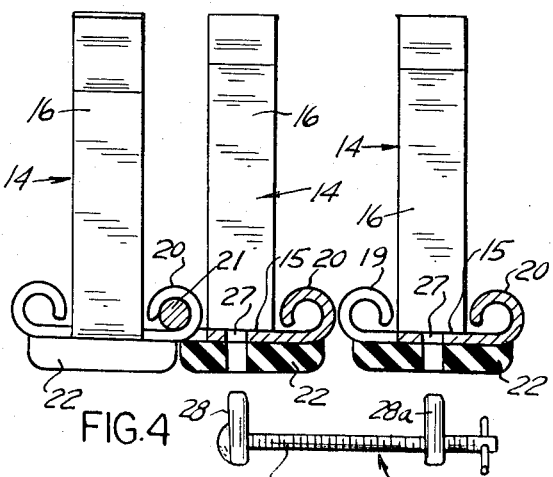
FIG. 4 is a cross-sectional view of several of the plate elements with a clamp means to help interconnect them.

Since it is desirable to tighten the strip slightly around the wheel rim and tire, for this purpose, openings 27 (see FIG. 4) may be formed in the bases 15 and cushions 22 to receive clamp legs 28 and 28a of a suitable mechanical clamp 29 having a screw 30 for moving the clamp legs together. The clamp legs are inserted into the openings 27 of the two end bases. Upon tightening of the screw 30, the clamp legs will move the bases closer together to align their end hinge loops 19-20 for manual insertion of the loose pin 21. At that point, the clamp may be removed. Other suitable clamping means may also be used for this purpose.

Once mounted around the outside of the tire, the strip 12 becomes self-sustaining and forms a tire or tread or rim upon which the vehicle may be driven a short distance to a service garage for repair or replacement of the flat tire.

Figure 6:
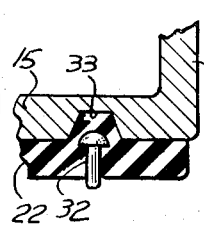
FIG. 6 is a fragmentary view of a modification of one of the plate elements to include conventional tire studs.

The strip may also function as a skid chain or snow tire tread since its outer surface is relatively rough and interrupted. For use on ice, conventional tire studs 32 may be added, by forming sockets 33 in the outer surfaces of each of the bases 15 so that a portion of the rubber cushion 22 fits within the sockets, and the tire studs are mounted within such portions, as shown in FIG. 6.

Thus, where the tire is inflated and bulged, rather than flat and more flexible, the legs may engage and lock against the sides of the tire due to the friction grip caused by the resiliency of the legs, without clamping to the wheel itself. The strip is then supported or backed by the tread of the tire.

Having fully described an operative embodiment of this invention, I now claim:

1. A temporary tire for a vehicle wheel, upon which a pneumatic tire is mounted, for attachment to the rim of the wheel and for encircling the tread of the tire comprising:

a number of flat plates hingedly connected together end to end to form a chain-like strip, with the plates being approximately as wide as the width of the tire treads;

the side edges of the plates having integral legs extended normally thereto to form spokes, with the free ends of said spokes being bent into inwardly opening channel shaped portions shaped to receive and frictionally grip the side edges of the rim of the wheel;

said strip being normally wrapped around the circumference of the tire, covering the tread thereof, with the spokes extending radially inwardly on opposite sides of the tire, to grip the wheel rim, wherein the strip forms an independent tire-like tread around the outside of the tire.

2. A wheel as defined in claim 1 and said plates having integral hinge loops formed on their opposite ends for interfitting with corresponding hinge loops on the next adjacent plate, and with hinge pins fitted through each interfitted set of loops for forming said strip.

3. A wheel as defined in claim 1 and said plates each being in the form of a long, flat metal strip bent into a U-shape whose base forms the plate portion and whose legs form the spoke portions, with a hinge half formed on each opposite edge of the plate portion and connected to corresponding hinge halves located on the next adjacent plates to hingedly connect the plates together and thereby form a continuous chain;

and at least one of the hinge connectors being manually releasable and connectable for opening and closing, respectively, the continuous chain.

4. A wheel as defined in claim 1 and the plates each having a rubber-like lower surface coating forming the outer peripheral face of the strip.

5. A wheel as defined in claim 4, and including tire studs embedded within and extending outwardly of said rubber-like lower surfaces for forming an ice gripping tread.

* * * * *